(12) United States Patent
Baccelli

(10) Patent No.: US 9,545,858 B2
(45) Date of Patent: Jan. 17, 2017

(54) BACK SEAT ARRANGEMENT OF A PASSENGER CAR

(71) Applicant: GM GLOBAL TECHNOLOGY OPERATIONS LLC, Detroit, MI (US)

(72) Inventor: Gian Luca Baccelli, Taunusstein-Orlen (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/573,649

(22) Filed: Dec. 17, 2014

(65) Prior Publication Data

US 2015/0175037 A1 Jun. 25, 2015

(30) Foreign Application Priority Data

Dec. 19, 2013 (DE) .................... 20 2013 011 386 U

(51) Int. Cl.
*B60N 2/30* (2006.01)
*B60N 2/36* (2006.01)
*B60N 2/01* (2006.01)

(52) U.S. Cl.
CPC ................ *B60N 2/304* (2013.01); *B60N 2/01* (2013.01); *B60N 2/30* (2013.01); *B60N 2/3043* (2013.01); *B60N 2/36* (2013.01)

(58) Field of Classification Search
CPC ................................................... B60N 2/305
USPC ................ 297/234, 248, 235, 236, 238, 256.1, 297/256.11, 256.12
See application file for complete search history.

(56) References Cited

U.S. PATENT DOCUMENTS

| | | | | |
|---|---|---|---|---|
| 1,420,095 A | * | 6/1922 | Gutter | A47C 4/10 297/44 |
| 2,116,366 A | * | 5/1938 | Scott | B60N 2/3011 297/234 |
| 4,609,221 A | | 9/1986 | Bottcher | |
| 5,374,106 A | * | 12/1994 | Hoefer | B60N 2/38 108/47 |
| 5,409,293 A | * | 4/1995 | Nagasaka | B60N 2/26 297/105 |
| 6,460,929 B2 | | 10/2002 | Kamida | |
| 6,629,729 B2 | * | 10/2003 | Wiedeman | B60N 2/3011 296/65.09 |

(Continued)

FOREIGN PATENT DOCUMENTS

| | | |
|---|---|---|
| DE | 9212370 U1 | 11/1992 |
| DE | 10112134 A1 | 9/2002 |

(Continued)

OTHER PUBLICATIONS

Search Report dated Jul. 24, 2014 for DE 20 2013 011 386.3.

*Primary Examiner* — Timothy J Brindley
(74) *Attorney, Agent, or Firm* — Lorenz & Kopf LLP

(57) ABSTRACT

A rear seat assembly for a vehicle is disclosed in which the seat cushions and the seat backs may be positioned on top of one another from a flat usage position into a non-usage position. Folding the seat cushions on top of one another and, folding the seat backs on top of one another takes place in order to form the loading space in the region of the back seat arrangement. The seat cushions and the seat backs, respectively, are stowed in a compact manner in the region of the passenger car and provides sufficient space for forming the loading space in the region of the back seat arrangement.

19 Claims, 9 Drawing Sheets

(56) References Cited

U.S. PATENT DOCUMENTS

| | | | | |
|---|---|---|---|---|
| 6,669,261 | B2* | 12/2003 | Roberts | B60N 2/3043 296/65.01 |
| 6,685,269 | B1* | 2/2004 | Freijy | B60N 2/206 297/257 |
| 6,773,059 | B2* | 8/2004 | Volotsenko | A47C 13/00 297/129 |
| 7,578,551 | B2* | 8/2009 | Linero | B64D 11/0693 297/107 |
| 8,393,677 | B2 | 3/2013 | Wieclawski | |
| 8,434,820 | B2* | 5/2013 | Woolston | B60N 2/01583 297/234 |
| 8,616,624 | B2* | 12/2013 | Yamada | B60N 2/3011 296/65.05 |
| 8,708,392 | B2* | 4/2014 | Otsuka | B60N 2/3011 296/65.05 |
| 8,757,719 | B2* | 6/2014 | Hayakawa | B60N 2/065 297/331 |
| 2006/0138838 | A1* | 6/2006 | DeLellis | B60N 2/1615 297/337 |
| 2008/0252121 | A1* | 10/2008 | Smith | B60N 2/3011 297/236 |
| 2009/0008975 | A1* | 1/2009 | Behrens | B60N 2/3011 297/236 |
| 2011/0227385 | A1 | 9/2011 | Holder | |

FOREIGN PATENT DOCUMENTS

| | | |
|---|---|---|
| DE | 102007049646 A1 | 4/2009 |
| DE | 102007052529 A1 | 5/2009 |
| DE | 102011120520 A1 | 6/2013 |
| FR | 2979863 A1 | 3/2013 |
| WO | 2005037599 A1 | 4/2005 |
| WO | 2011055070 A1 | 5/2011 |
| WO | 2011135218 A1 | 11/2011 |

* cited by examiner

BACK SEAT ARRANGEMENT OF A PASSENGER CAR

CROSS REFERENCE TO RELATED APPLICATION

This application claims priority to German Patent Application No. 202013011386.3 filed Dec. 19, 2013, which is incorporated herein by reference in its entirety.

TECHNICAL FIELD

The present disclosure relates to a back seat arrangement of a passenger car, and more particularly to a back seat arrangement that is used in a small car.

BACKGROUND

Back seat arrangements for passenger cars are known that have seats arranged adjacent to one another and that each have a seat part and a backrest. In small cars, the space available can indeed be restricted in such a manner that only minimal loading space is available in the rear region of the vehicle. By folding the back seat arrangement, the loading space can be extended into the region of the back seat arrangement.

From DE 10 2007 052 529 A1, a back seat arrangement for a passenger car is known. The back seat arrangement has three seats which are arranged next to one another and which each have a seat part and a backrest. In order to increase a loading space, for example, the respective backrest can be folded forwards onto the seat part so that the load can be placed onto the backrest. For increasing the loading space in the lateral regions which adjoin the middle seat it is further provided to fold the seat part of the respective outer seat against the backrest and to rotate this arrangement by 90° with respect to the horizontal so that with an arrangement of the respective outer seat adjacent to the middle seat, a load-through possibility is provided between the outer seat and that side panel of a body part that faces the outer seat.

SUMMARY

In accordance with the present disclosure a back seat arrangement of a passenger car, in particular for use in a small car, is provided which, with regard to construction and handling effort, enables in the simplest way possible to form loading space of the passenger car in the region of the back seat arrangement. In an embodiment, the seat parts may be laid on top of one another from a flat usage position into a non-usage position, and the backrests can be laid on top of one another from a flat usage position into a non-usage position.

Thus, on the one hand, folding the seat parts on top of one another and, on the other, folding the backrests on top of one another takes place in order to form the loading space in the region of the back seat arrangement. For forming the loading space in the non-usage position of the arrangement of the seat parts and the non-usage position of the arrangement of the backrests, the seat parts and the backrest, respectively, are stowed in a compact manner in the region of the passenger car that serves for accommodating the back seat arrangement in the usage position thereof With this compact arrangement of the seat parts and the backrests, sufficient space for forming the loading space in the region of the back seat arrangement is made in that region of the passenger car that is taken up by the back seat arrangement in the usage position.

Thus, the seat parts and the backrests can each be folded like a book. The arrangement of the seat parts and the arrangement of the backrests is therefore compact and practicable. The seat parts and/or the backrests are placed in the non-usage position in such a manner that they are arranged in an upright position. The seat parts and backrests thus take up space substantially in the vertical direction, where space is available anyway to a sufficient degree in this region of the passenger car.

Particularly large loading space can be created if in the non-usage position, the seat parts and/or the backrests are arranged in the region of a side panel of the passenger car. It is not required that the seat parts and the backrests are arranged in the region of the of the same side panel of the passenger car. However, this is often regarded to be advantageous since then the region of the other side panel of the passenger is completely available for forming the loading space.

With regard to usage position of the seat parts, the seat parts are preferably connected to one another on their facing sides to be pivotable about a first axis. The pivotable connection of the two seats enables in a simple manner to transfer the seat parts from the usage position into the non-usage position since only a folding process is required. The seat parts are in particular identical so that in the non-usage position, they lie flat on top of one another and the arrangement of the two seat parts thus has double the height of a single seat part.

The one seat part, on its side facing away from the other seat part, is preferably mounted in a body part of the passenger car to be pivotable about a second axis, wherein this second axis is arranged parallel to the first axis that connects the seat parts. This configuration enables a defined mounting of the one seat part in the body part via the second axis and the connection of the two seat parts via the first axis. This, on the one hand, enables simple folding of the seat parts for transitioning from the usage position into the non-usage position and on the other, it enables simple moving of the arrangement of the two seat parts in a non-usage position which is arranged in particular in the region of a side panel of the passenger car.

In the usage position, the seat part facing away from the second axis can preferably be fixed on its side facing away from the second axis in the body part by a first fastener. When mounting the one seat part in the body part by the second axis and mounting the two seat parts inside each other by the first axis, a fixed connection of the arrangement of the two seat parts in the body part is obtained and thus a defined mounting of the two seat parts in their usage position.

It is regarded to be advantageous if, with regard to the usage position, the backrests are connected to one another on their facing sides to be pivotable about a third axis. The connection of the backrests thus is carried out corresponding to that of the seat parts, as a result of which the backrests can be folded on top of one another in a constructional simple manner and with uncomplicated handling. The backrests are likewise identical so that in the non-usage position, thus in the position folded on top of one another, they have an approximate height that is double the height of a single backrest. The backrests folded on top of one another form a homogeneous block.

The one backrest, on its side facing away from the other backrest, is preferably mounted in a body part of the passenger car to be pivotable about a fourth axis. The fourth axis is arranged parallel to the third axis that connects the backrests. In this respect, mounting of the one backrest is provided that is comparable to the mounting of the one seat part. This applies also to the fixation of the other backrest. Thus, it is preferably provided that in the usage position, the backrest facing away from the fourth axis can be fixed on its side facing away from the fourth axis in the body part by a second fastener. By the third and fourth axes and the second fastener, a strong and stable mounting of the two backrests in their usage position is obtained in the body part.

Since the seat parts in the usage position usually rest on a floor region of the body part whereas the backrests in their usage position do not rest with their rear surface on a support surface, it is provided according to an advantageous refinement that in the usage position at least one backrest. In particular both backrests can be fixed or are fixed in the region facing the third axis in a floor region of the body part by a third fastener. This ensures a stable mounting of the two backrests in the region of the third axis in the floor region of the body part. Due to the third axis that connects the two backrests, this stable mounting can be carried out by a fastener that is associated with a backrest. However, instead of this, a latch or fastener can be provided in the region of the third axis, which fastener is associated with both backrests. The fastener can be transferred into the non-fixing position so that after transferring the second fastener into the non-fixing position thereof, the backrests can be pivoted about the third axis and thus can be folded back and, furthermore, the arrangement of the backrests can be pivoted about the fourth axis so as to rest against a side panel of the body part.

It is regarded to be advantageous if by the first and/or second fastener, the seat parts and backrests, respectively, can be fixed in a side panel of the body part. This mounting is regarded as the preferred option because it is carried out in the vertical extent of the loading space or the back seat arrangement and accordingly is particularly stable.

Preferably, the side parts and/or the backrests can be secured in their non-usage position with a retainer. For example, a retainer in the form of a strap or elastic band may be connected with one end, for example, to the side panel of the body part. With regard to the non-use of the seat parts or backrests, the retainer is fed past that side of the arrangement of backrests or seat parts that faces away from the side panel and is connected in the region of the other end to the side panel of the body part.

The side parts and/or the backrests are preferably each mounted in frames that are pivotally connected to each other. The one frame, on its side facing away from the other frame, is pivotally mounted in a body part of the motor vehicle. The other frame, in the region of its end facing away from the one frame, can be fixed in the body part. Such a frame construction is configured in a simple manner and is well suited for receiving the cushions used for the respective seat part and the respective backrest. The respective frame is in particular formed by a tube. The frame is preferably a rectangular frame.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
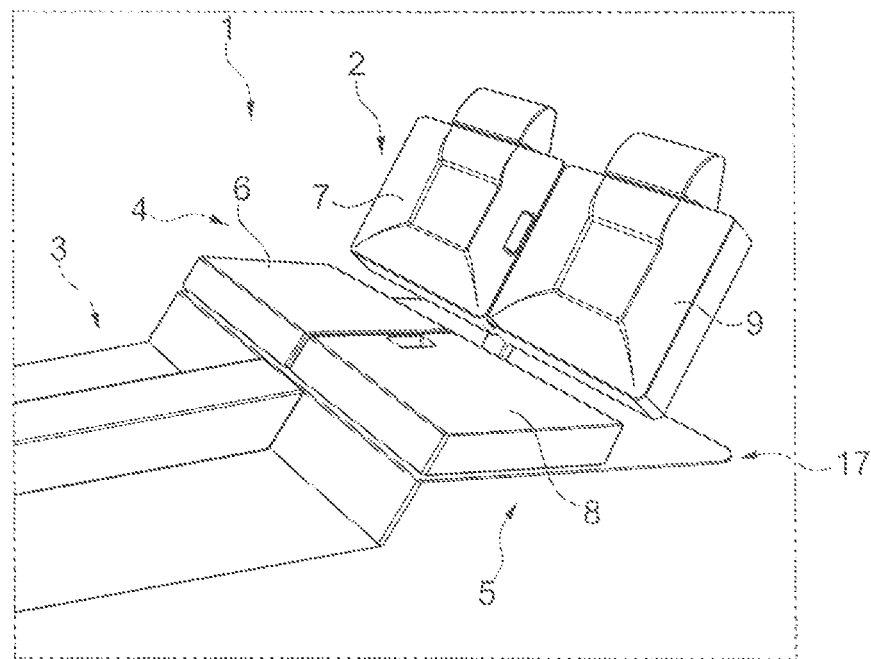
FIG. 1 shows a passenger car in the region of a back seat arrangement that is in a usage position.

Illustrated in FIG. 1 is a section of a passenger car 1, which is a small car. The latter is illustrated in the region of a rear row of seats 2 and a foot well 3 for the rear row of seats 2 that extends in front of the row of seats. This rear row of seats 2 includes two seats 4, 5 which are arranged directly adjacent next to one another. The two seats 4, 5 arranged next to one another take up substantially the entire width of an interior of the passenger car 1. Behind the rear row of seats 2, a loading space can be formed which, in light of the fact that the passenger car 1 is a small car, has only a relatively small volume. The seat 4 has a seat part or seat cushion 6 and a backrest or seat back 7, wherein a headrest is integrated in the backrest 7. The seat 5 has a seat part or seat cushion 8 and a backrest or seat back 9, wherein a headrest is integrated in the backrest 9.

Apart from minor deviations which are described in greater detail below, the two seat parts 6 and 8 are formed to be identical and the two backrests 7 and 9 are formed to be identical. The seat parts 6, 8 and the backrests 7, 9 are substantially cube-shaped, corresponding to the structure and shape of a cube-shaped cushion so as to ensure sufficient cushioning for passengers using the respective seat 4 or 5.

In the FIGS. 1 to 8, the basic modification of the seats 4 and 5 for forming a loading space 10 in the region of the rear row of seats 2 is illustrated.

Figure 5:
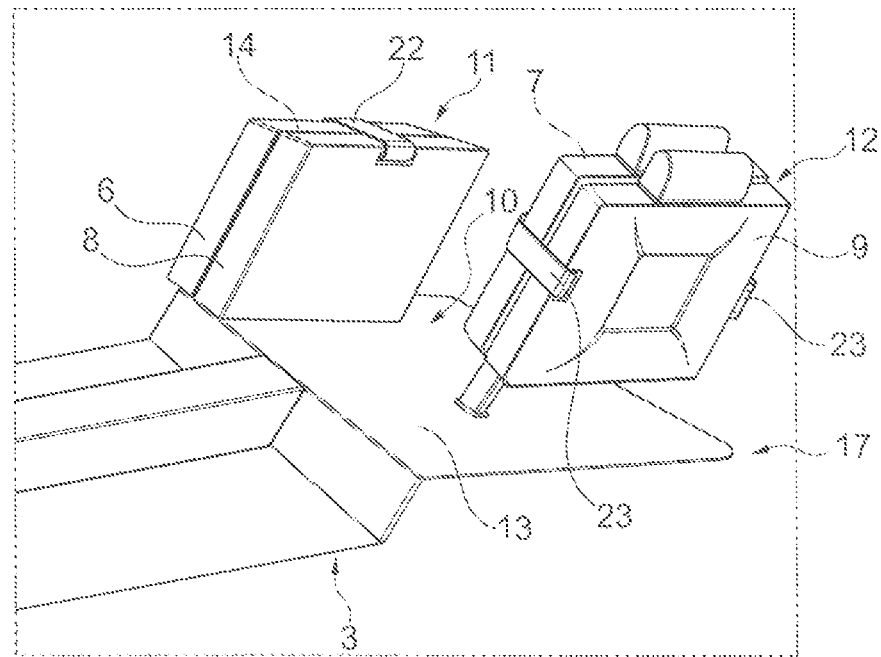
FIG. 5 shows the back seat arrangement according to FIG. 4 with the backrests in the non-usage position.

Thus, as is apparent from the illustration of the FIGS. 1 and 5, the seat parts 6 and 8 can be laid on top of each other from the flat usage position shown in FIG. 1 into the non-usage position shown in FIG. 5, and the backrests 7 and 9 can be laid on top of each other from the flat usage position shown in FIG. 1 into the non-usage position shown in FIG. 5. Hereby, as is apparent from the illustration of FIG. 5, the loading space 10 is formed in the region of the rear row of seats 2 between the arrangement 11 of the two seat parts 6 and 8 and the arrangement 12 of the two backrests 7 and 9. This loading space 10 is variable, as is described in greater detail below.

In the non-usage position, the seat parts 6 and 8 and the backrests 7 and 9 are arranged in an upward position, as is apparent from the illustration of FIG. 5. It is also apparent from this figure that the seat parts 6 and 8 and the backrests 7 and 9 are arranged in the region of side panels of the passenger car 1. The side panels as such are not shown, but they arise implicitly from the lateral boundary of the foot well 2 and that portion of a body part 17 of the passenger car 1 that forms the floor 13, which is arranged below the seats 4 and 5 with respect to the usage position thereof.

With respect to the usage position, the seat parts 6 and 8 are connected to one another on their facing sides so as to be pivotable about a first axis 14. Furthermore, the seat part 6, on the side facing away from the seat part 8, is mounted in the body part 17 of the passenger car 1 so as to be pivotable about a second axis 15. The two axes 14, 15 are arranged in parallel. With respect to the usage position of the seat parts 6 and 8, the seat part 8, on its side facing away from the axis 14, can be fixed on the floor 13 of the body part 17 by a first fastener 16.

With respect to the usage position, the backrests 7 and 9 are connected to one another on their facing sides so as to be pivotable about a third axis 18. On its side facing away from the backrest 7 or the axis 18, the backrest 9 is mounted in the body part 17 so as to be pivotable about a fourth axis 19, to be more specific, it is mounted in the non-illustrated side part of the body part 17. The axes 18 and 19 are arranged in parallel. The backrest 17, on its side facing away from the third axis 18, can be fixed in the usage position in the body part 17, in particular in a side part of the part 17, by two fasteners 20. Furthermore, in the usage position, the backrest 9 can be fixed in the region of the axis 18 in the floor 13 by a third fastener 21. When the fastener 21 is disengaged from the floor 13, the arrangement 12 can be swiveled from the usage position into the non-usage position.

Furthermore, a fastener 22 for fixing the seat parts 6 and 8 in their non-usage position and a fastener 23 for fixing the backrests 7 and 9 in their non-usage position are provided.

Figure 2:
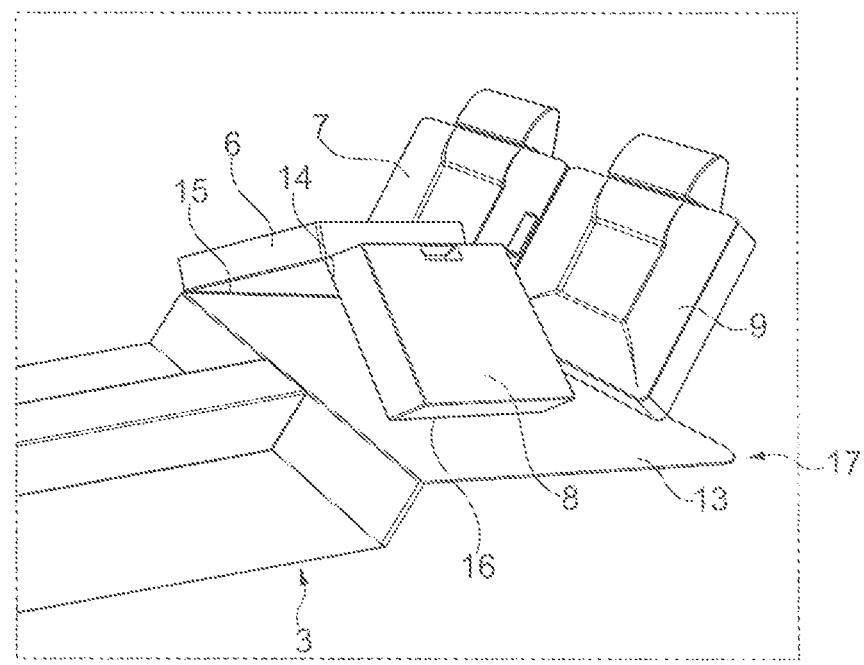
FIG. 2 shows a back seat arrangement according to FIG. 1 during the transfer of the seat parts into a non-usage position.
Figure 3:
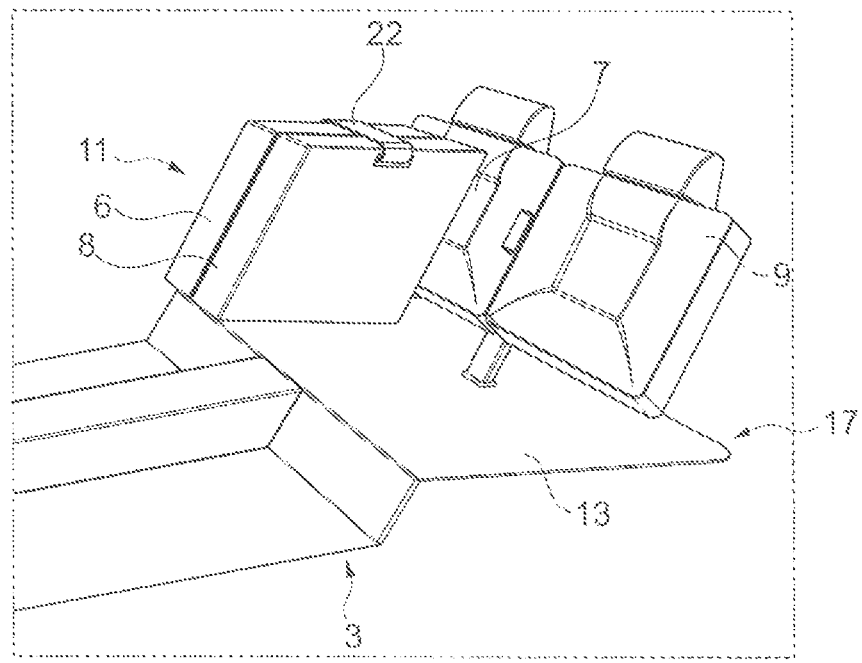
FIG. 3 shows a back seat arrangement according to the FIGS. 1 and 2, with the seat parts transferred into the non-usage position.
Figure 4:
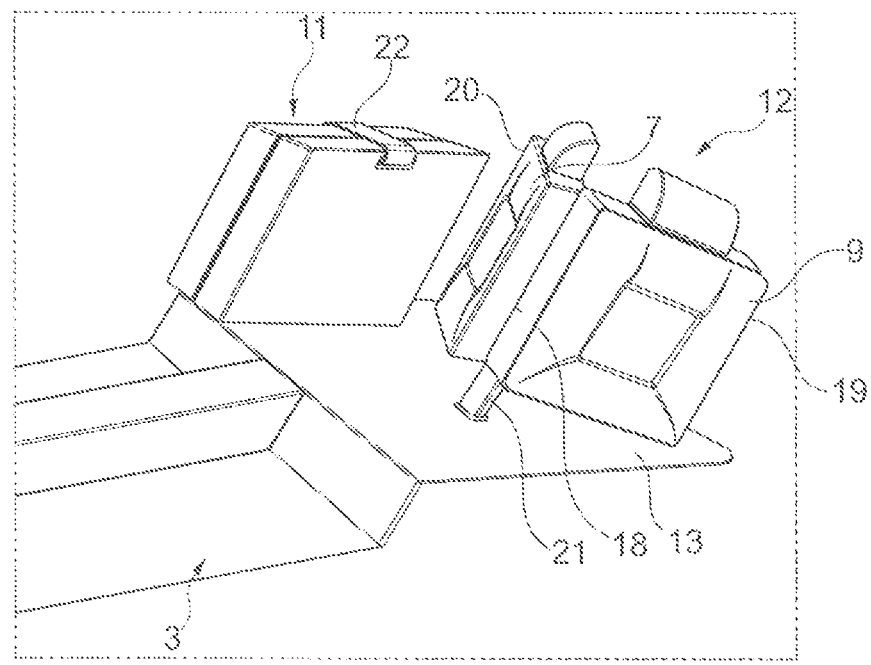
FIG. 4 shows the back seat arrangement according to FIG. 3 during the transfer of the back seats into their non-usage position.

FIG. 1 shows the components of the passenger car 1 described in this respect in the usage position of the seat parts 6 and 8 and of the backrests 7 and 9. FIG. 2 shows an intermediate position of the seat parts 6 and 8 during the transfer from the usage position into the non-usage position. Here, the first fastener 16 is disengaged and both the seat parts 6 and 8 can swivel towards each other with respect to the axis 14 and the seat part 6 can swivel about the axis 15 with respect to the body part 17 or the floor 13. FIG. 3 shows the seat parts 6 and 8 in their position folded on top of one another, thus in their non-usage position. In this position, the arrangement 11 is fixed on the side panel of the body part 17 by the fastener 22. FIG. 4 shows the subsequent transfer of the backrests 7 and 9 from the usage position into the non-usage position, illustrated in an intermediate position. The fasteners 20 are disengaged so that the backrests 7 and 9 can swivel towards one another about the axis 18 and, moreover, the backrest 9 can swivel about the axis 19 that is fixed on the body. FIG. 5 shows the arrangement 12 in the non-usage position, which arrangement is formed by the backrests 7 and 9. In this non-usage position, the arrangement 12 rests against the side panel of the body part 11 and is fixed there by the fastener 23.

Figure 6:
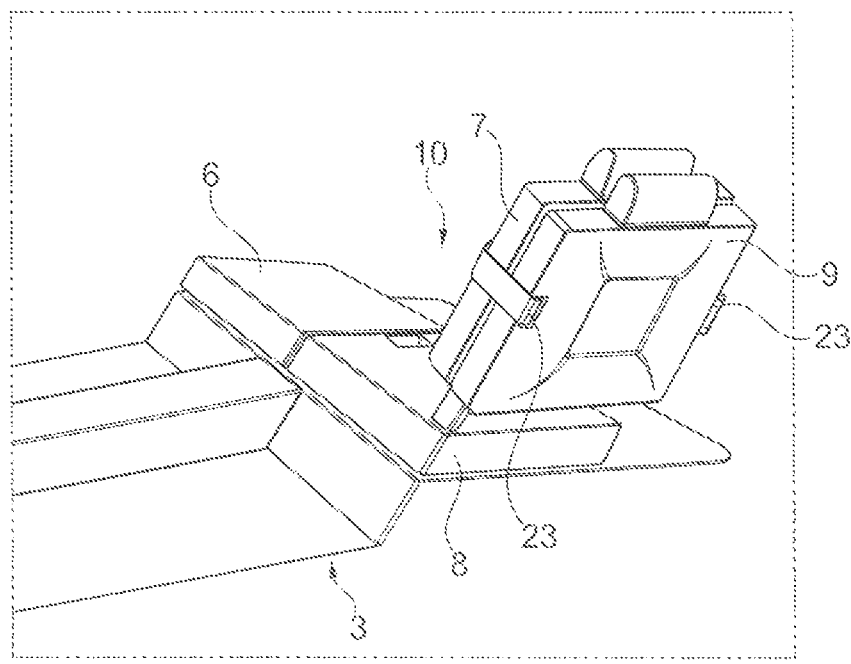
FIG. 6 shows the back seat arrangement according to FIG. 1 in a usage position of the seat parts and a non-usage position of the backrests.

FIG. 6 shows an alternative in which the seat parts 6 and 8 remain in their usage position and only the arrangement 12 formed from the backrests 7 and 9 is transferred into the described non-usage position.

Figure 7:
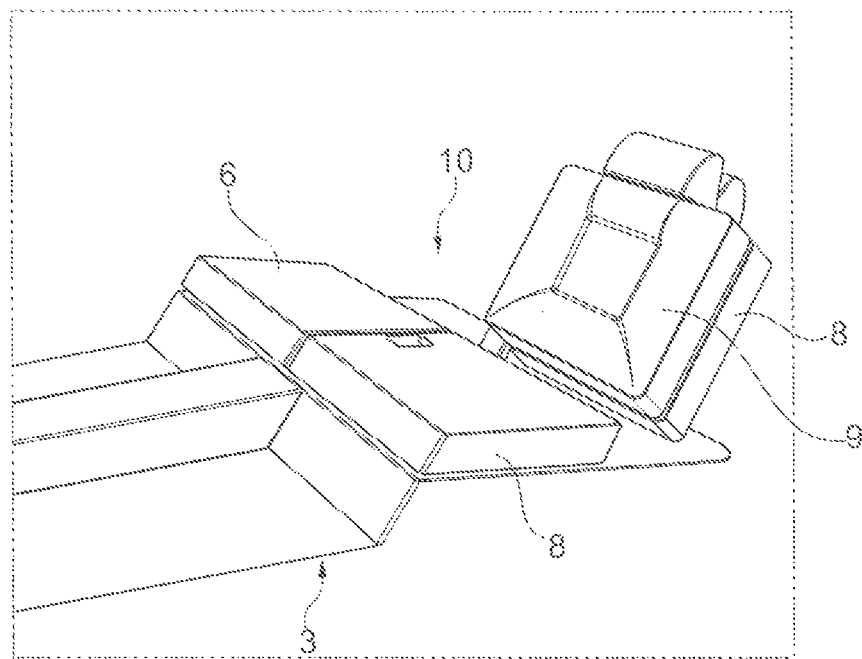
FIG. 7 shows a back seat arrangement according to FIG. 1 in the usage position of the seat parts and in the non-usage position of one of the two backrests.

FIG. 7 shows an arrangement that is modified in such a manner that the two seat parts 6 and 8 are in their usage position and, furthermore, the backrest 9 is in its usage position and is fixed here by the fastener 21 while the backrest 7 in its non-usage position is swiveled against the rear panel of the backrest 9.

Figure 8:
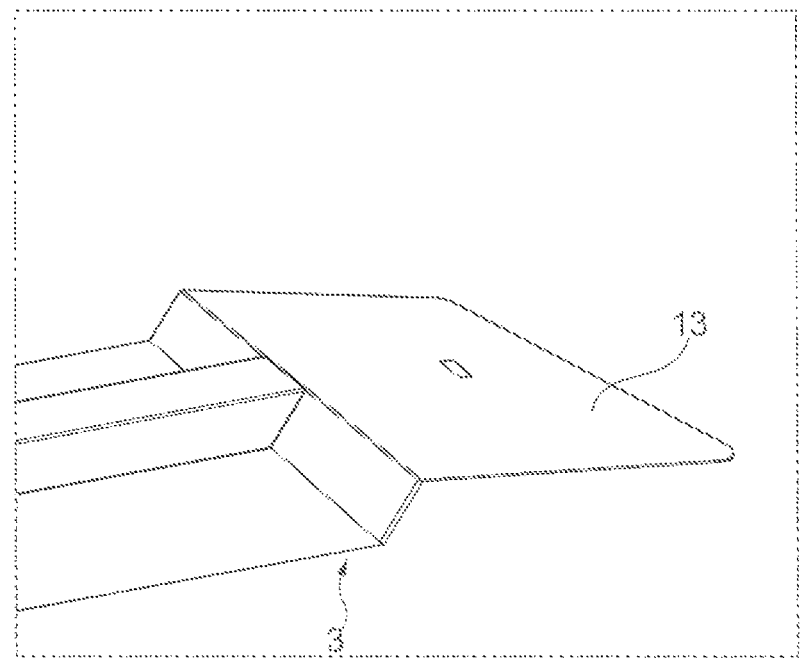
FIG. 8 shows the region of the passenger car illustrated in FIG. 1 with disassembled seat parts and disassembled backrests.

FIG. 8 illustrates a state in which the seat parts 6 and 8 as well as the backrests 7 and 9 are disassembled with respect to the body part 17 so that the region of the passenger car 1 that is taken up in the usage position of the seat parts 6 and 8 and the backrests 7 and 9 is now completely available as loading space.

As described above, FIGS. 1 to 8 show that by modifying the arrangement of the seat parts 6, 8 and the backrests 7, 9, different additional loading spaces can be formed in the region of the rear row of seats 2.

FIGS. 9 to 17 illustrate for a modified embodiment the construction of the rear row of seats 2 in greater detail in which the construction of the arrangement 11 and the seat parts 6 and 8 forming this arrangement. It is shown that the seat part 6 has a frame 24 and the seat part 8 has a frame 25. These frames 24, 25 are pivotally connected in the region of the axis 14 by joints 26. The frame 24, in the region of its side facing away from the other frame 25 or the axis 14, is pivotally mounted in the region of the axis 15 in joints 27 on the body part. The frame 25, in the region of its end facing away from the frame 24 or the axis 14, thus is in the region of the axis 16, can be fixed to the body part 17, specifically to the floor 13, by a fastener 16. The respective frame 24 or 25 is surrounded by a cushion 29 of the respective seat part 6 or 7, respectively.

Figure 9:
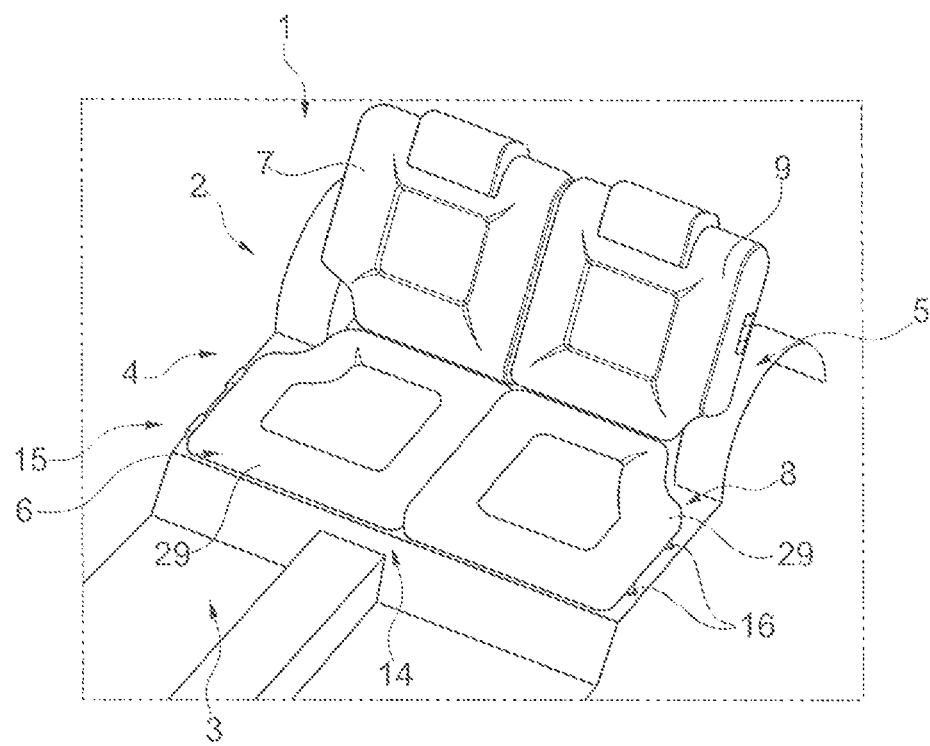
FIG. 9 shows a passenger car in the region of a back seat arrangement that is modified with respect to that according to the FIGS. 1 to 8, illustrated in the usage position of the seat parts and the backrests.
Figure 10:
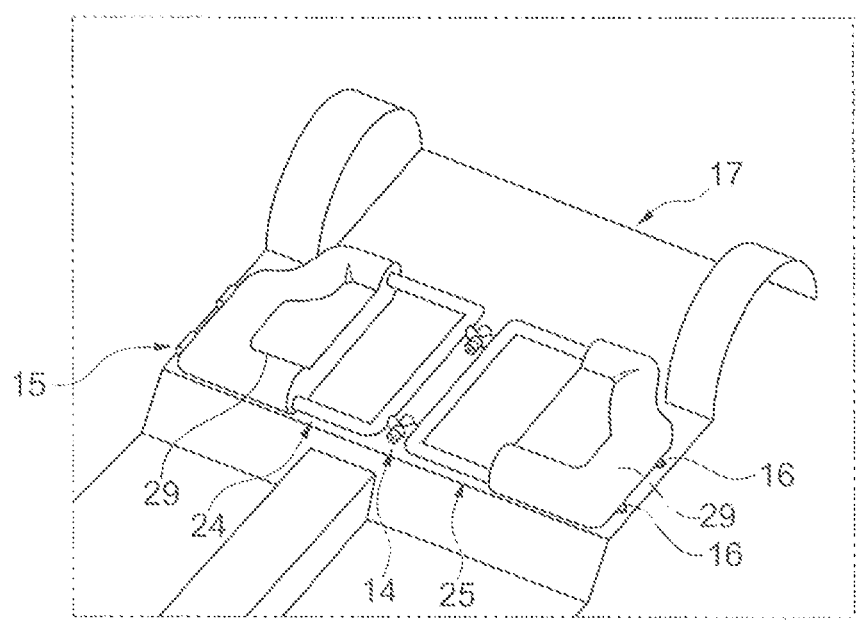
FIG. 10 shows the back seat arrangement, illustrated with regard to the seat parts in the usage position, wherein the cushions of the seat parts are removed in part so as to illustrate components of the frame forming the seat parts.
Figure 11:
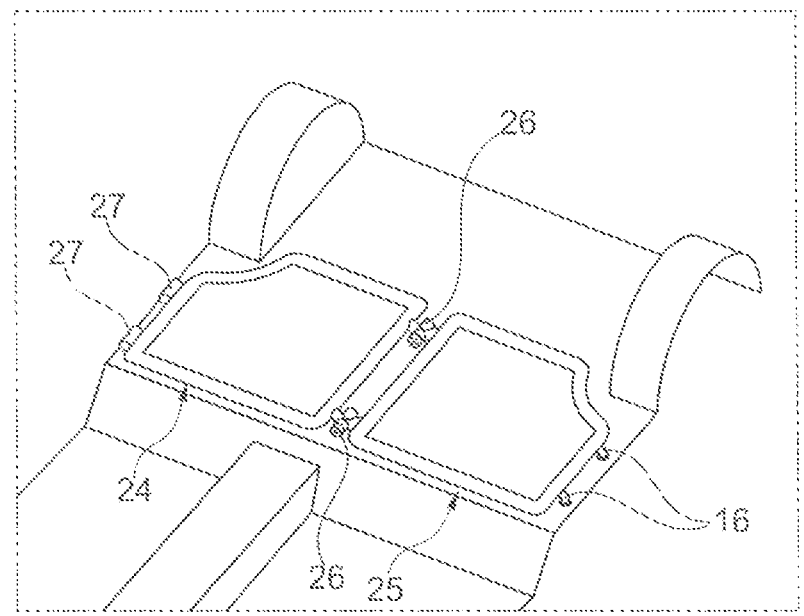
FIG. 11 shows the arrangement according to FIG. 10, but illustrated without cushions.
Figure 12:
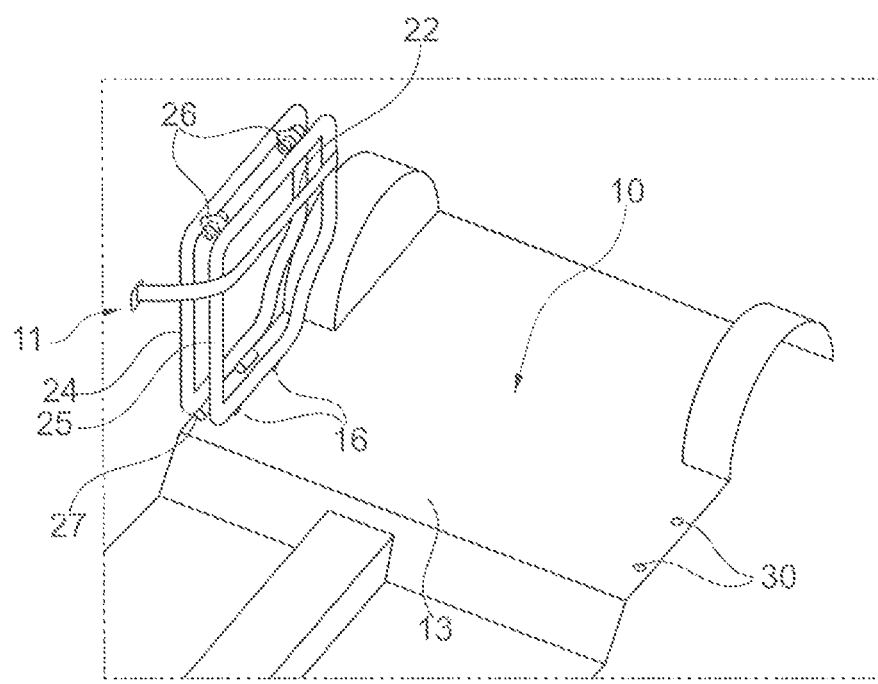
FIG. 12 shows the arrangement according to FIG. 11, thus only the frame, illustrated for the non-usage position of the seat parts.

FIG. 9 shows the seat parts 6 and 8 in the usage position. FIG. 10 likewise shows the seat parts 6 and 8 in their usage position; however, for a better illustration of the construction, the region of the cushion 29 adjacent to the joints 26 is not illustrated. FIG. 11 shows the arrangement of the seat parts 6 and 8 in their usage position; however, it is shown only with respect to the arrangement of the frames 24 and 25. FIG. 12, again only with respect to the frames 24 and 25, shows the arrangement of the latter when the seat parts 6 and 8 are in their non-usage position, wherein the fastener 22 for fixing the arrangement 11 are also shown at the same time. The fastener 22 is an elastic fixation band. FIG. 12 also illustrates two receptacles 30 in the floor 13, wherein the fastener 16 interact with these receptacles in the usage position of the arrangement 11.

FIGS. 13 to 17 show a construction of the rear row of seats 2 in the region of the backrests 7 and 9, which largely corresponds to the construction of the seat parts 6 and 8 according to the FIGS. 9 to 12. However, shown here are always only a frame 30 of the backrest 7 and a frame 31 of the backrest 9.

Shown are joints 32 which connect the two frames 30 and 31 in the region of the axis 18 and, furthermore, joints 32 which connect the backrest 9 in the region of the axis 19 to the side panel of the body part 17, and finally the fasteners 20 for fixing the frame 30 and thus the backrest 7 in the other side panel of the body part 17.

In the region of its upper end, the respective frame 30 or 31 has receptacles 34 for inserting the headrests. In the region of the joints 32, thus of the axis 18, the frame 30 or 31 is provided with the fastener 21 that is formed as a downwardly directed locking bar. Each locking bar 21 can be manually operated by a mechanism 28 that is arranged in the upper region of the backrest 7 or 9 so that each backrest 7 or 9 can be separately locked and/or unlocked on the floor side.

Figure 13:
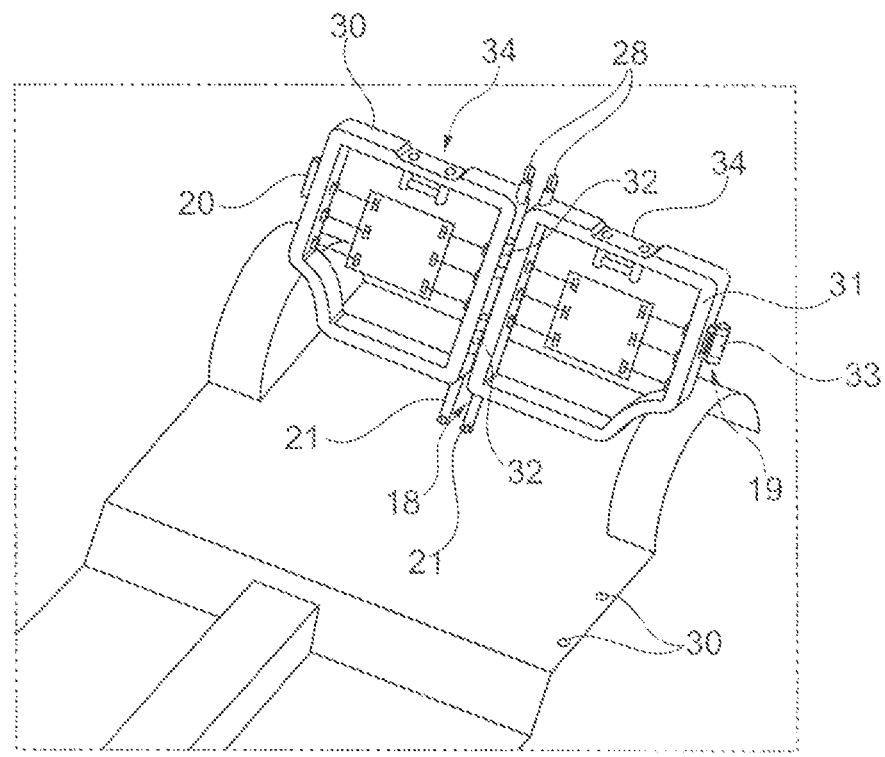
FIG. 13 shows the passenger car illustrated only for the region of the backrests and only for the frames of the backrests, shown for the usage position of the backrests, in a front view.
Figure 14:
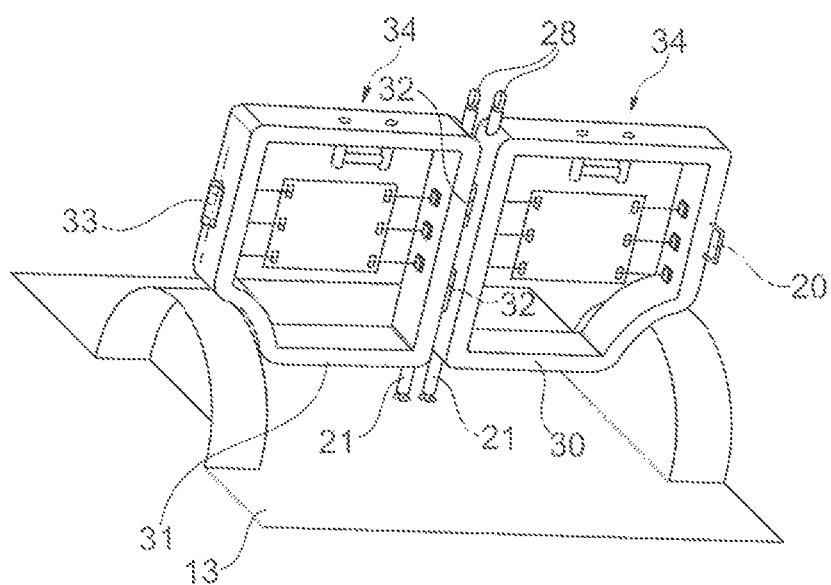
FIG. 14 shows the arrangement according to FIG. 13 in a rear view.
Figure 15:
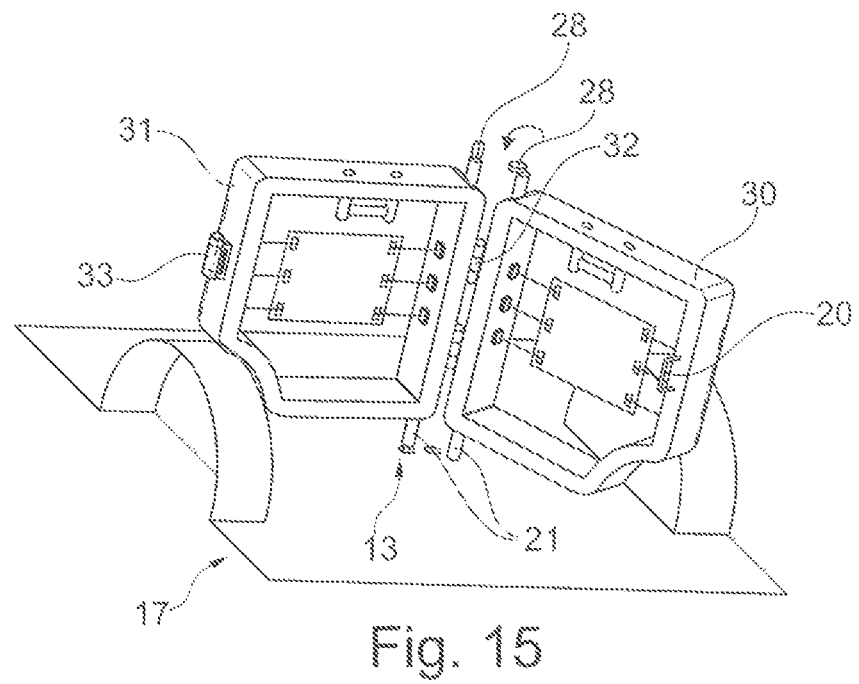
FIG. 15 shows the arrangement according to FIG. 14, illustrated with the backrest or the frames of the backrest swiveled into an intermediate position.
Figure 16:
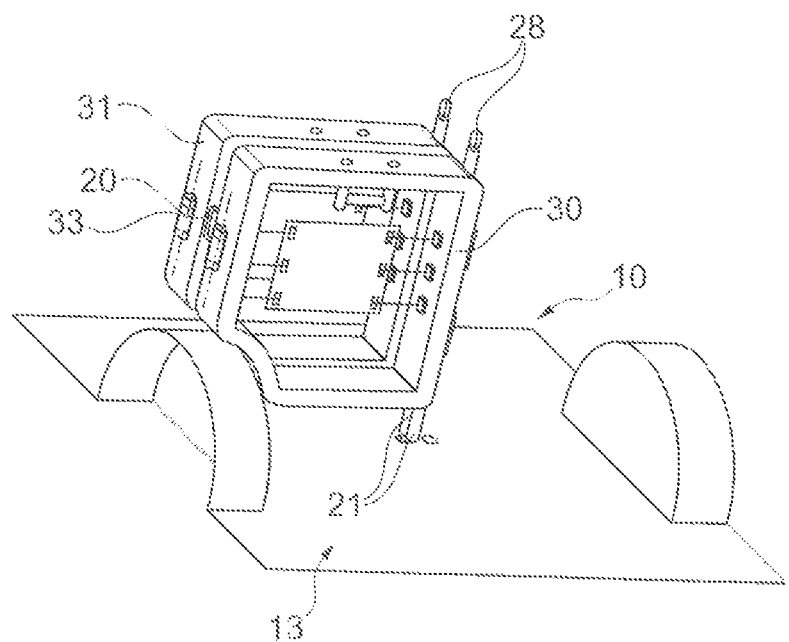
FIG. 16 shows the arrangement according to FIG. 15 with the other backrest completely swiveled against the one backrest, illustrated only with regard to the frames.

FIG. 13 shows the backrests 7 and 9 in their usage position, specifically the frames 30 and 31 in a position that corresponds to this usage position of the backrests 7, 9. Here, the frames 30, 31 are fixed by the fastener 21. FIG. 13 illustrates the situation in a front view and FIG. 14 in a rear view. For transferring only the backrest 7 into the non-usage position for the purpose of increasing the loading space, the fasteners 20, as shown in the illustration of FIG. 15, is unlocked and by actuating the mechanisms 28, the fastener 21 associated with the backrest 7 or the frame 30 is disengaged from the floor 13. Thus, by swiveling rearwards, the backrest 7 can be moved against the rear surface of the backrest 9. This end position is shown in FIG. 16. Through this folding of the arrangement 12 formed from the backrests 7 and 9, a loading space extending over half the width of the vehicle interior is available so that through-loading of items to be loaded next to the arrangement 12 is possible.

Figure 17:
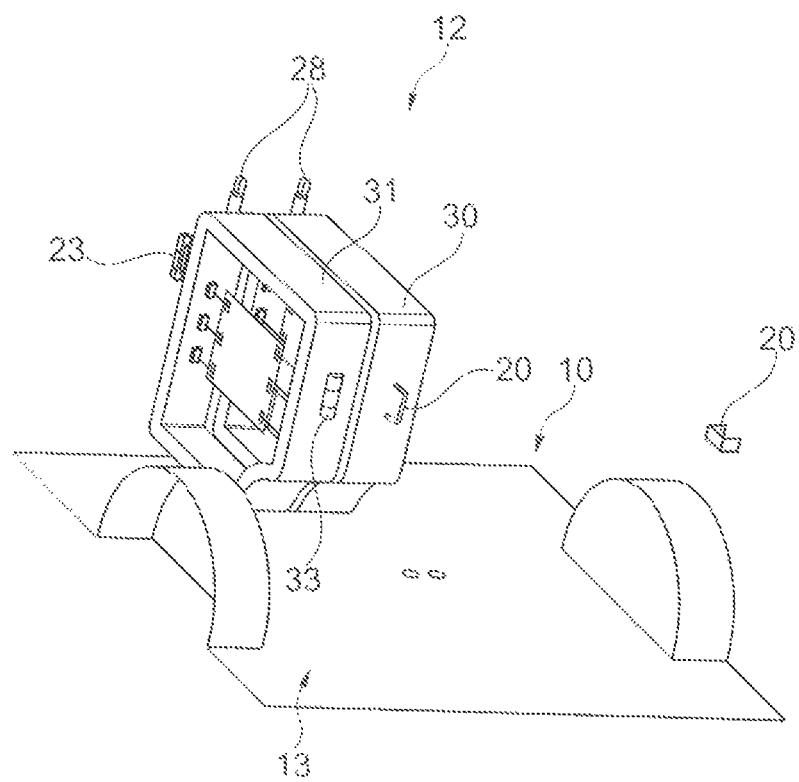
FIG. 17 shows another non-usage position of the arrangement of the two backrests or frames of the backrest, in which the one backrest or the one frame is arranged in the region of a side panel of the body part.

FIG. 17 shows another increase of the loading space in that the fastener 21 associated with the backrest 9 is also disengaged from the floor 13 by actuating the associated mechanism 28 so that the arrangement 12, namely the two backrests 7 and 9, can be jointly swiveled forwards about the joints 33 until the backrest rests against the side panel of the body part 17 and is fixed there by the fastener 23 that likewise is formed as an elastic band.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A rear seat arrangement for a passenger car having at least two seats arranged adjacently each other, each seat comprising:
   a seat part positionable between a flat usage position and a non-usage position;
   a backrest positionable between a flat usage position and a non-usage position;
   wherein the seat parts can be laid on top of one another in the non-usage position and the backrests can be laid on top of one another in the non-usage position, and the seat parts are connected to one another on a facing side to be pivotable about a first axis when in the usage position, and one seat art is mounted in a body part of the passenger car on a side facing away from the other seat part to be pivotable about a second axis, wherein this second axis is arranged parallel to the first axis that connects the seat parts.

2. The rear seat arrangement according to claim 1, wherein at least one of the seat parts and at least one of the backrests are arranged upright when in the non-usage position.

3. The rear seat arrangement according to claim 1, wherein at least one of the seat parts and at least one of the backrests are arranged in a body part region of the passenger car when in the non-usage position.

4. The rear seat arrangement according to claim 1, further comprising a panel fastener for fixing at least one of the backrests and a side panel in a non-usage position.

5. The rear seat arrangement according to claim 1, wherein the seat part facing away from the second axis in the usage position is fixed on a side facing away from the second axis in the body part by a fastener.

6. A rear seat arrangement for a passenger car having at least two seats arranged adjacently each other, each seat comprising:
   a seat part positionable between a flat usage position and a non-usage position;
   a backrest positionable between a flat usage position and a non-usage position;
   wherein the seat parts can be laid on top of one another in the non-usage position and the backrests can be laid on top of one another in the non-usage position, and wherein the backrests are connected in the usage position on facing sides and pivotable about a third axis.

7. The rear seat arrangement according to claim 6, wherein a backrest on a side facing away from another backrest is mounted in a body part of the passenger car and pivotable about a fourth axis, wherein the fourth axis is arranged parallel to the third axis that connects the backrests.

8. The rear seat arrangement according to claim 6, wherein at least one of the seat parts and at least one of the backrests are fixable in a side panel of the body part with at least one of a first fastener and a second fastener.

9. The rear seat arrangement according to claim 7, wherein the backrest facing away from the fourth axis in the usage position is fixable on a side facing away from the fourth axis in the body part by a second fastener.

10. The rear seat arrangement according to claim 6, wherein at least one backrest in the usage position is fixed in a floor region of the body part in the region facing the third axis by a third fastener.

11. The rear seat arrangement according to claim 10, wherein at least one of the seat parts and at least one of the backrests are fixable in a side panel of the body part with at least one of a first fastener and a second fastener.

12. The rear seat arrangement according to claim 6, wherein at least one of the seat parts and at least one of the backrests are arranged upright when in the non-usage position.

13. The rear seat arrangement according to claim 6, wherein at least one of the seat parts and at least one of the backrests are arranged in a body part region of the passenger car when in the non-usage position.

14. The rear seat arrangement according to claim 6, wherein at least one backrest in the usage position is fixed in a floor region of the body part in the region facing the third axis by a third fastener.

15. The rear seat arrangement according to claim 14, wherein and at least one of the seats parts and at least one of the backrests are fixable in a side panel of the body part with at least one of a first fastener and a second fastener.

16. The rear seat arrangement according to claim 6, further comprising a panel fastener for fixing at least one of the backrests and a side panel in a non-usage position.

17. A rear seat arrangement for passenger car having at least two seats arranged adjacently each other, each seat comprising:

a seat part positionable between a flat usage position and a non-usage position;
a backrest positionable between a flat usage position and a non-usage position;
wherein the seat parts can be laid on top of one another in the non-usage position and the backrests can be laid on top of one another in the non-usage position, and at least one of the seats parts and at least one of the backrests have a frame assembly that is pivotally interconnected, the frame assembly including a first frame element on a side facing away from a second frame, the first frame element is pivotally mounted in a body part of the passenger car, and the second frame element in a region of an end facing away from the first frame element is fixable in the body part.

18. The rear seat arrangement according to claim 17, wherein the first and second frame elements are formed by tubular members.

19. The rear seat arrangement according to claim 17, wherein the first and second frame elements comprise rectangular frame elements.

* * * * *